United States Patent
Ishikawa et al.

(10) Patent No.: US 7,012,639 B1
(45) Date of Patent: *Mar. 14, 2006

(54) IMAGE PICKUP SYSTEM WITH COLOR SPACE CONVERSION

(75) Inventors: Motohiro Ishikawa, Kanagawa-ken (JP); Kenichi Kondo, Kanagawa-ken (JP); Nobuo Fukushima, Kanagawa-ken (JP); Masayoshi Sekine, Tokyo (JP); Koichi Sono, Kanagawa-ken (JP); Gaku Watanabe, Tokyo (JP); Yuji Koide, Kanagawa-ken (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154 (a)(2).

Subject to any disclaimer, the term of this patent is extended or adjusted under 35 U.S.C. 154(b) by 0 days.

(21) Appl. No.: 08/682,997

(22) Filed: Jul. 18, 1996

(30) Foreign Application Priority Data

Jul. 24, 1995 (JP) .................................. 7-187434

(51) Int. Cl.
H04N 7/18 (2006.01)
(52) U.S. Cl. ........................ 348/222; 348/272
(58) Field of Classification Search ................. 348/552, 348/333, 272, 222, 207
See application file for complete search history.

(56) References Cited

U.S. PATENT DOCUMENTS

| | | | | |
|---|---|---|---|---|
| 5,218,350 A | * | 6/1993 | Bollman | 345/137 |
| 5,471,577 A | * | 11/1995 | Lightbody | 348/552 |
| 5,559,954 A | * | 9/1996 | Sakoda | 345/133 |
| 5,568,192 A | * | 10/1996 | Hannah | 348/552 |
| 5,734,425 A | * | 3/1998 | Takizawa | 348/552 |

* cited by examiner

Primary Examiner—Anand Rao
(74) Attorney, Agent, or Firm—Cowan, Liebowitz & Latman, P.C.

(57) ABSTRACT

In order to transfer at a high speed a large amount of data, such as data of a moving image, an image pickup system having an image pickup apparatus is arranged to convert an object image inputted through an optical system into an electrical signal, to convert the electrical signal into a digital signal by an A/D conversion part, to obtain from the digital signal a video signal in a predetermined form by a video signal generating part, to convert a color space of the video signal by a color space converting part in such a way as to compress the video signal according to a look-up table held within the color space converting part, and to transfer the compressed video signal to an external personal computer through an interface part.

18 Claims, 5 Drawing Sheets

| P11 | P12 | P13 | P14 | P15 | P16 | P17 | P18 | P19 |
|-----|-----|-----|-----|-----|-----|-----|-----|-----|
| P21 | P22 | P23 | P24 | P25 | P26 | P27 | P28 | P29 |

FIG. 2(b)

| P11 | P12' | P14 | P15' | P17 | P18' |
|-----|------|-----|------|-----|------|
| P21' | P23 | P24' | P26 | P27' | P29 |

IMAGE PICKUP SYSTEM WITH COLOR SPACE CONVERSION

BACKGROUND OF THE INVENTION

1. Field of the Invention

This invention relates to an image pickup system and an image pickup apparatus arranged to be capable of transferring a large amount of picked-up image data at a high speed with simple arrangement.

2. Description of the Related Art

Figure 6:
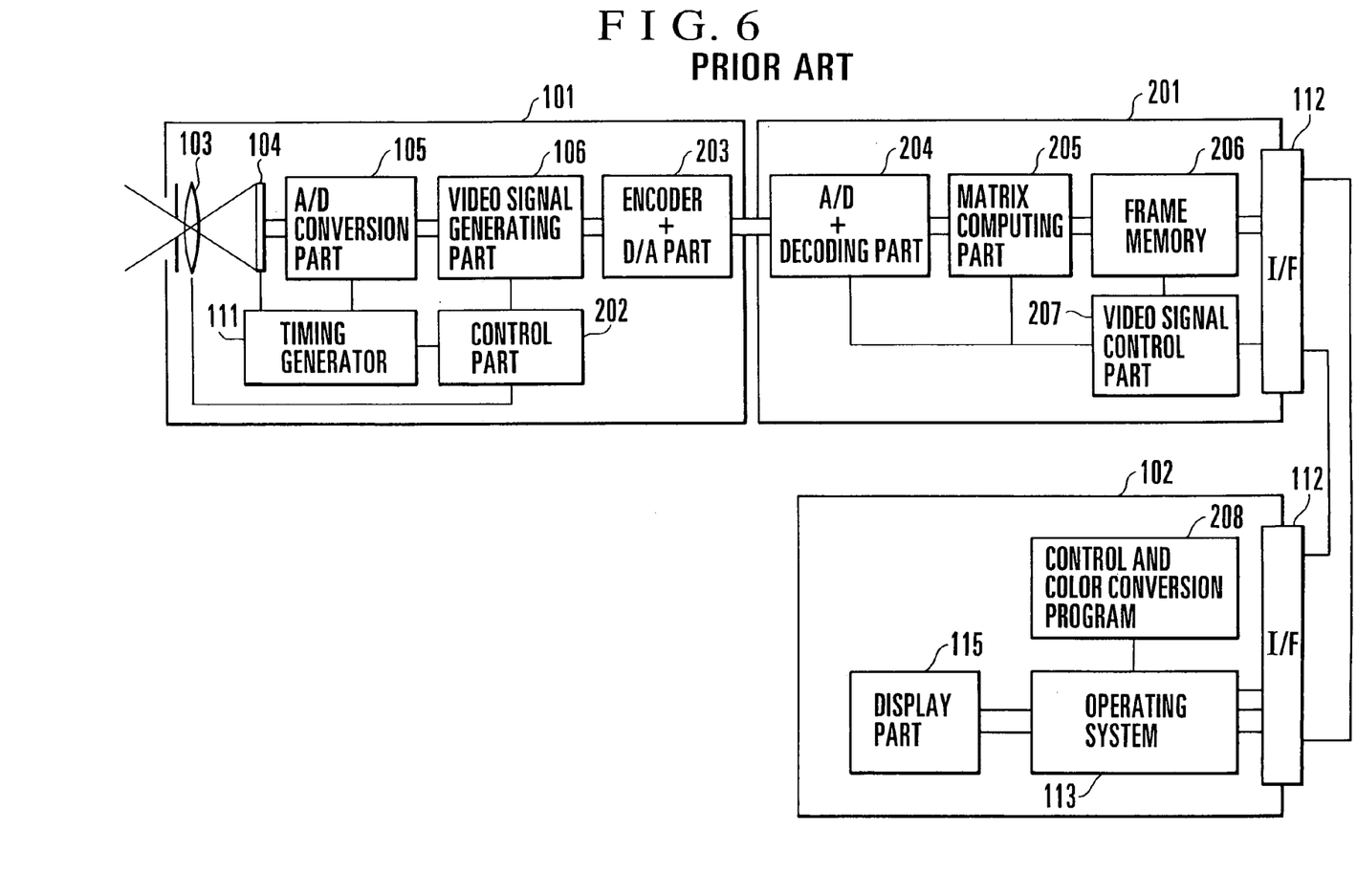
FIG. 6 is a block diagram showing, by way of example, the arrangement of the conventional image pickup system.

FIG. 6 is a block diagram showing the arrangement of the conventional image pickup system. The conventional image pickup system is composed of an image pickup apparatus 101, a video input card 201 and a personal computer (hereinafter referred to as PC) 102. A video image picked up by the image pickup apparatus 101 is displayed at the PC 102. Transfer between the image pickup apparatus 101 and the video input card 201 is conducted in analog signals. The video input card 201 is connected to the PC 102 by a digital interface (hereinafter referred to as I/F) part 112. In picking up an image, these parts operate as described below.

In the image pickup apparatus 101, a control part 202 supplies synchronizing and driving signals to a timing generator 111 and a video signal generating part 106 at the time of video shooting. The timing generator 111 then forms signals for driving a CCD 104 and an A/D (analog-to-digital) converting part 105 on the basis of the signals from the control part 202.

When an image of an object of shooting is formed on the CCD 104 through an optical system 103, the image is converted into a digital signal by the CCD 104 and the A/D conversion part 105. The digital signal is sent to a video signal generating part 106, which adjusts the digital signal into a video signal. The adjustment includes gain (AE) adjustment and white balance (AWB) adjustment which are carried out in a known manner.

The digital video signal thus formed by the video signal generating part 106 is sent to an encoding-and-D/A part 203 to be converted into an analog video signal conforming to the NTSC system. The analog video signal is sent to the video input card 201.

In the video input card 201, the analog video signal is first converted into digital luminance and color-difference signals by an A/D-and-decoding part 204. The luminance and color-difference signals are supplied to a matrix computing part 205 to be converted into R, G and B signals each of which consists of 8 bits. The R, G and B signals are stored in a frame memory 206 as a video signal.

The video signal stored in the frame memory 206 is read out according to a reading signal coming from the PC 102 which is connected to the video input card 201 via an I/F part 112. The video signal is sent to the PC 102 through the I/F part 112. Each part of the video input card 201 is controlled by a video signal control part 207.

The video signal is taken into the PC 102 by operating a program 208 which is provided on the PC 102. When an instruction is given from the program 208 to read a video image, an operating system 113 sends a reading signal to the video input card 201 through the I/F part 112. As a result, the video signal comes to be recorded on a memory (not shown) which is disposed within the PC 102. The input video signal has each picture element thereof composed of a total of 24 bits including 8 bits for each of colors R, G and B. When video image data for one picture has been inputted, the program 208 converts a color space of the video image according to the capability of a display part 115.

In a case where, for example, the display capability of the display part 115 indicates 16 bits of color, the program 208 thins the picture element value of 24 bits on the memory down to 15 bits, i.e., five bits for each of the colors R, G and B and records the thus-thinned video signal on the memory again. If the display capability of the display part 115 indicates 8 bits of color, the program 208 looks up the video image data on the memory to create optimum conversion pallet data for 8 bits. The conversion pallet data is sent via the operating system 113 to the display part 115 to match the color space.

The program 208 converts the value of each picture element on the memory on the basis of the above-stated conversion pallet data. Upon completion of conversion of data for one picture, the program 208 sends the data to the display part 115 via the operating system 113 so as to have the picked-up video image displayed there.

In order to send the picked-up video image in a digital form to the displaying PC without changing the digital form, the conventional image pickup system or the image pickup apparatus necessitates use of a high speed I/F and a high speed CPU. Accordingly, some trouble, such as a frame dropout or the like, might take place in the stage of displaying a picked-up moving image, depending on the processing capability of the system as a whole. In such a case, it is hardly possible to fully utilize the moving-image processing capability of the image pickup apparatus. Further, in a case where an analog I/F is employed for a higher processing speed, it has been hardly possible to avoid a deterioration in picture quality due to a noise.

SUMMARY OF THE INVENTION

This invention is directed to the solution of the problems of the prior art mentioned in the foregoing. It is, therefore, an object of this invention to provide an image pickup system and an image pickup apparatus arranged to solve the problems by compressing picked-up image data according to a conversion table on the side of the image pickup apparatus before transferring the image data, so that a moving image picked up can be transferred in a digital form, even if the image pickup system has a low transfer speed and a low processing speed as a whole.

In accordance with a first aspect of the invention, to attain the above-stated object, an image pickup system arranged according to this invention comprises an image pickup apparatus having an image sensor for photo-electrically converting a picked-up object image into an electrical signal, a video signal generating part for forming a video signal from the electrical signal, a color space converting part for converting a color space of the video signal and an interface (I/F) part for externally transferring the video signal, and a control part for controlling the image pickup apparatus through the interface part, wherein the video signal is compressed according to a look-up table (hereinafter referred to as LUT) held within the color space converting part.

In accordance with a second aspect of the invention, in the image pickup system defined as the first aspect above, the color space converting part is arranged to convert information of a plurality of kinds corresponding to picture elements into predetermined information in accordance with the LUT.

In accordance with a third aspect of the invention, in the image pickup system defined as the first aspect above, the control part and the color space converting part are arranged to hold the LUT in common.

In accordance with a fourth aspect of the invention, in the image pickup system defined as the first aspect above, the color space converting part is provided with a plurality of LUTs and the control part is arranged to arbitrarily select one of the LUTs.

In accordance with a fifth aspect of the invention, in the image pickup system defined as the first aspect above, the LUT is held in a ROM disposed within the color space converting part.

In accordance with a sixth aspect of the invention, in the image pickup system defined as the fifth aspect above, the image pickup apparatus has attribute information about the interface part and the LUT held in common within the ROM.

In accordance with a seventh aspect of the invention, in the image pickup system defined as the first aspect above, the LUT is held in a reloadable memory disposed within the color space converting part.

In accordance with an eighth aspect of the invention, in the image pickup system defined as the seventh aspect above, the LUT is recorded by the control part through the interface part into the reloadable memory disposed within the color space converting part.

In accordance with a ninth aspect of the invention, in the image pickup system defined as the first aspect above, the LUT is held within the color space converting part in the form of a logic circuit.

In accordance with a tenth aspect of the invention, an image pickup apparatus according to the invention comprises an image sensor for photo-electrically converting a picked-up object image into an electrical signal, a video signal generating part for forming a video signal from the electrical signal, a color space converting part for converting a color space of the video signal, and an interface (I/F) part for externally transferring the video signal, wherein the video signal is compressed according to a look-up table (hereinafter referred to as LUT) held within the color space converting part.

In accordance with an eleventh aspect of the invention, in the image pickup apparatus defined as the tenth aspect above, the color space converting part is arranged to convert information of a plurality of kinds corresponding to picture elements into predetermined information in accordance with the LUT.

In accordance with a twelfth aspect of the invention, in the image pickup apparatus defined as the tenth aspect above, a control part for controlling the transfer of video image data through the interface is provided externally of a body of the image pickup apparatus.

In accordance with a thirteenth aspect of the invention, in the image pickup apparatus defined as the twelfth aspect above, the control part and the color space converting part are arranged to hold the LUT in common.

In accordance with a fourteenth aspect of the invention, in the image pickup apparatus defined as the twelfth aspect above, the color space converting part is provided with a plurality of LUTs and the control part is arranged to arbitrarily select one of the LUTs.

In accordance with a fifteenth aspect of the invention, in the image pickup apparatus defined as the tenth aspect above, the LUT is held in a ROM disposed within the color space converting part.

In accordance with a sixteenth aspect of the invention, in the image pickup apparatus defined as the fifteenth aspect above, attribute information about the interface part and the LUT are held in common within the ROM.

In accordance with a seventeenth aspect of the invention, in the image pickup apparatus defined as the twelfth aspect above, the LUT is held in a reloadable memory disposed within the color space converting part.

In accordance with an eighteenth aspect of the invention, in the image pickup apparatus defined as the seventeenth aspect above, the LUT is recorded by the control part through the interface part into the reloadable memory disposed within the color space converting part.

In accordance with a nineteenth aspect of the invention, in the image pickup apparatus defined as the tenth aspect above, the LUT is held within the color space converting part in the form of a logic circuit.

In accordance with a twentieth aspect of the invention, an image pickup unit arranged according to the invention comprises image pickup means for picking up an optical image to form a picked-up image signal, interface means for performing communication with an external signal processing apparatus, and compression control means for controlling and changing a compression characteristic for the picked-up image signal of the image pickup means according to a control signal supplied from the external signal processing apparatus through the interface means.

In accordance with a twenty-first aspect of the invention, the image pickup unit defined as the twentieth aspect above is arranged to be removably attachable to the external signal processing apparatus.

In accordance with a twenty-second aspect of the invention, in the image pickup unit defined as the twentieth aspect above, the compression control means is arranged to change the compression characteristic by converting a color space of the picked-up image signal.

In accordance with a twenty-third aspect of the invention, in the image pickup unit defined as the twentieth aspect above, the compression control means is provided with a plurality of look-up tables for converting a color space of the picked-up image signal.

In accordance with a twenty-fourth aspect of the invention, a picked-up image signal processing apparatus arranged according to the invention comprises interface means for performing communication with an image pickup unit including image pickup means for picking up an optical image to form a picked-up image signal, and transmission control means for transmitting to the image pickup unit through the interface means a control signal for controlling and changing a compression characteristic of the image pickup means.

In accordance with a twenty-fifth aspect of the invention, in the picked-up image signal processing apparatus defined as the twenty-fourth aspect above, the image pickup unit is arranged to be removably attachable to the picked-up image signal processing apparatus.

In accordance with a twenty-sixth aspect of the invention, in the picked-up image signal processing apparatus defined as the twenty-fourth aspect above, the transmission control means is arranged to change through the interface means the compression characteristic of the image pickup means by converting a color space of the picked-up image signal.

In accordance with a twenty-seventh aspect of the invention, the picked-up image signal processing apparatus, defined as the twenty-fourth aspect above, further comprises image display means and, in the picked-up image signal processing apparatus, the transmission control means is arranged to change the compression characteristic of the image pickup means through the interface means according to a capability of the image display means.

As described above, in accordance with the invention, a large amount of data, such as the data of a moving image, can be transferred by a simple arrangement even in a case where the system has a low data transfer capability and a low processing capability as a whole. The invention, therefore, gives a system of a high degree of universality.

The above and further objects and features of the invention will become apparent from the following detailed description of preferred embodiments thereof taken in connection with the accompanying drawings.

DETAILED DESCRIPTION OF THE PREFERRED EMBODIMENTS

Preferred embodiments of the invention are described below with reference to the drawings.

First Embodiment

Figure 1:
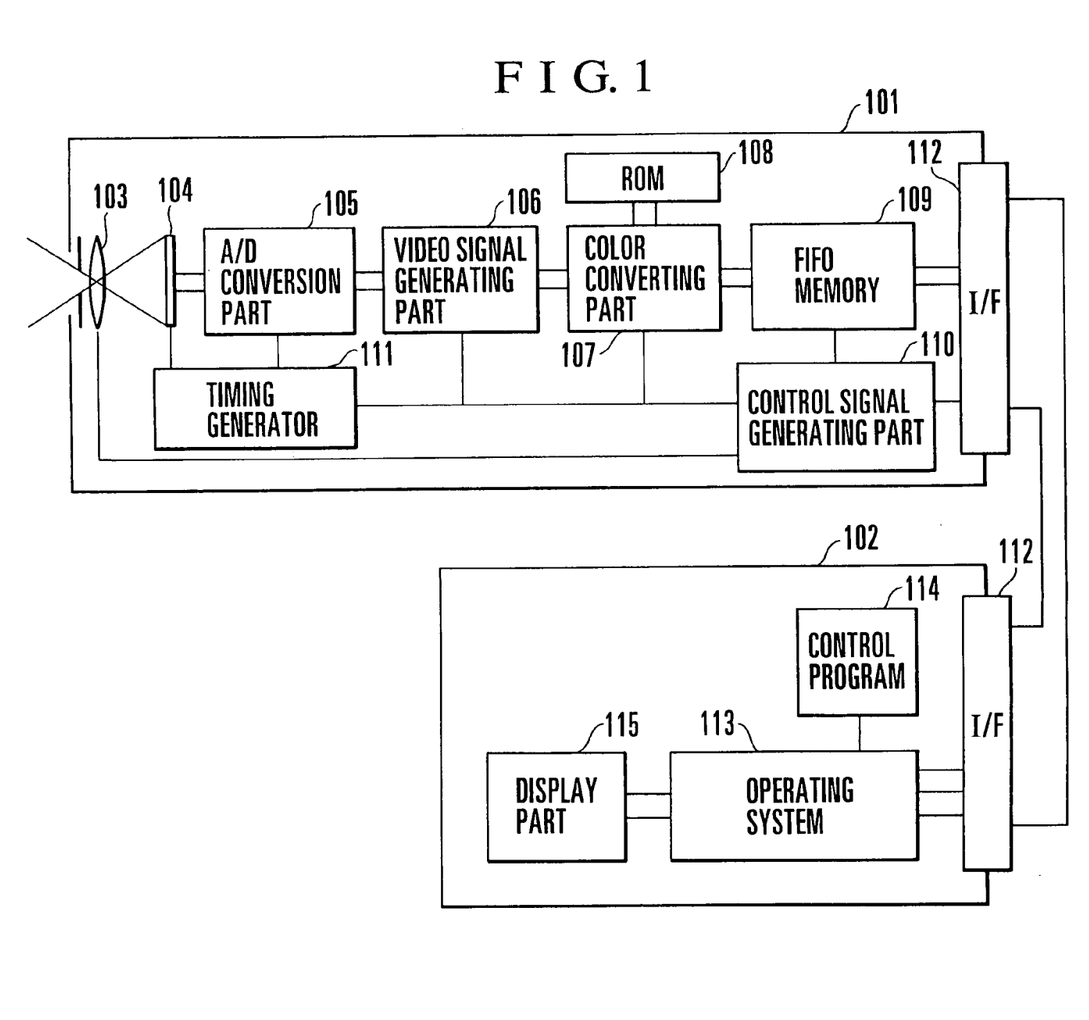
FIG. 1 is a block diagram showing the arrangement of a first embodiment of the invention.

FIG. 1 is a block diagram showing the arrangement of an image pickup system which is a first embodiment of the invention. The image pickup system is composed of an image pickup apparatus 101 and a PC (control part) 102 which controls the image pickup apparatus 101 through an interface (I/F) part 112. The image pickup apparatus 101 is thus arranged to be operated through a control program 114 disposed on the PC 102, which is an external signal processing apparatus removably attachable to the image pickup apparatus 101 through the I/F part 112. In this case, the I/F part 112 is assumed to be a parallel I/F of 16 bits, which may be replaced either with some other parallel I/F of a different bus width or with some serial I/F. Instructions for a start and an end of a shooting operation, setting shooting conditions, etc., are arranged to be given by the operator of the system on the control program 114.

In shooting, i.e., taking a picture, the operator first sets the shooting conditions. More specifically, the operator sets the number of colors and the size of images to be transferred from the image pickup apparatus 101 to the PC 102. In a case where a large amount of continuous data such as data of a moving image is to be handled, for example, the moving image thus obtained would become unnatural due to dropping out of some frames if the transfer speed of the I/F part 112 or the processing speed of the external PC 102 is slower than the processing speed of the image pickup apparatus 101.

To minimize fluctuations in the state of display due to differences of elements constituting the system, therefore, the shooting conditions are set in such a way as to restrict the amount of data to be transferred from the image pickup apparatus 101, so that continuous moving images can be reproduced in a natural state irrespective of the constitution of the image pickup system. More specifically, the number of colors can be selectively set at any of three steps including a 16 bit color space, an 8 bit color space and an 8 bit gray scale. The image size can be selectively set at any of two steps including a size equal to and a size ¼ of a maximum image size obtainable from the image pickup apparatus 101. The shooting conditions thus can be selectively set in a combination most apposite to the system to be used by the operator.

The setting values are variable by the operator even while a shooting operation is in process. Further, the results of setting are sent from the control program 114 via the I/F part 112 to a control signal generating part 110 disposed within the image pickup apparatus 101. The apparatus is controlled on the basis of the setting values.

A shooting operation for video images begins when a shooting start instruction sent from the control program 114 via the I/F part 112 is received by the control signal generating part 110. In response to the shooting start instruction, the control signal generating part 110 sends signals to a video signal generating part 106 and a timing generator 111. Then, the timing generator 111 forms signals for driving a CCD 104 and an A/D conversion part 105 and sends the signals to drive them.

The CCD 104, which is an image pickup means, photo-electrically converts into an electrical signal an optical image formed on its light receiving plane through an optical system 103 which is provided for taking the image of an object of shooting. The electrical signal is converted into a digital signal by the A/D conversion part 105. The digital signal is sent to the video signal generating part 106 to be adjusted and converted into a video signal. The adjustment to be made by the video signal generating part 106 includes a gain adjustment process for shooting conditions, white balance adjustment process, image size adjustment process, etc. Since the gain and white balance adjustment processes are performed in a known manner, only the image size adjustment is described as follows.

As mentioned above, the size of the image to be picked up is set at the control program 114 which is provided on the PC 102. On the side of the image pickup apparatus 101, picture elements are thinned down for converting an input signal to the set image size on the basis of the setting value. In a case where the CCD 104 is arranged for the NTSC system and its picture elements are not in a square shape, a process of converting the picture elements into square picture elements is also performed for displaying a video image without distortion.

Figures 2A, 2B:
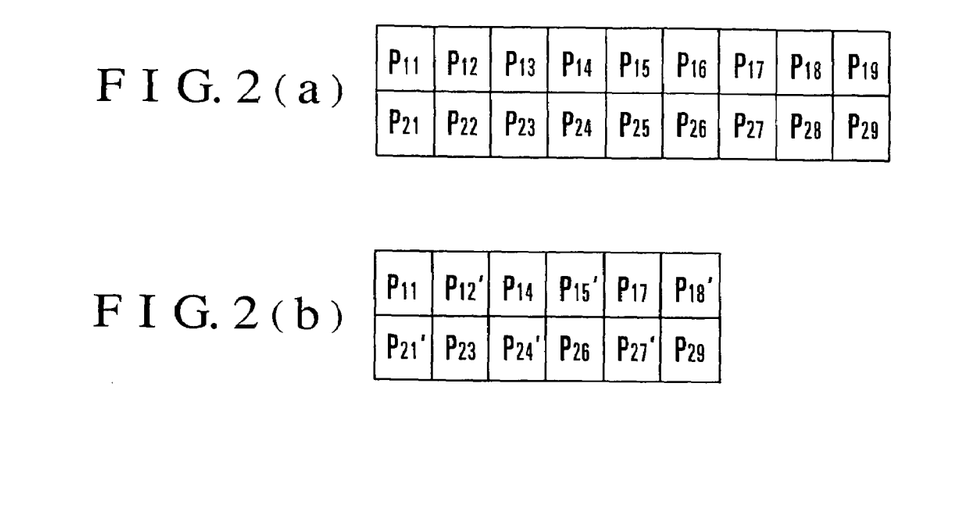
FIGS. 2(a) and 2(b) show, by way of example, square picture element conversion.

As shown in FIGS. 2(a) and 2(b), the square picture element conversion is made in the following manner. Among three horizontally aligned picture elements P11, P12 and P13 in one line, the first picture element P11 is left as it is, while a picture element 12' is formed from the other two picture elements P12 and P13 by interpolation. In a next line, another picture element P21' is formed from the first two picture elements P21 and P22, while a remaining picture element P23 is used as data as it is.

As apparent from the above, the positions of the interpolating picture elements are interchanged for every line. The picture elements thus can be converted into square picture elements without much deteriorating the picture quality by virtue of the interpolating process. This process is not necessary if the CCD 104 has square picture elements. In a case where the image is outputted in a maximum size while the setting value is also at the maximum size under this condition, no size converting process is performed. If the setting value is ¼ of the maximum image size, on the other hand, the square picture elements are thinned down to ½ in each of the horizontal and vertical directions. In this instance, the process of thinning to ½ lowers the resolution of the image and causes some aliasing distortion. To prevent such picture quality deterioration, an LPF process is carried out before interpolating the picture elements. The video signal is outputted after the above-stated process. The video signal is a full color video signal of 24 bits expressed independently by 8 bits for each of colors R, G and B. However, it is also possible to use luminance and color-difference signals (Y, U, V) or the like.

Next, the video signal of 24 bits is converted on the basis of a number-of-color setting value set at the control program 114. The video signal is further subjected to a color space process at a color space converting part 107 to be converted into a data format required for handling by the PC 102. This color space conversion is performed to convert the video signal into a designated color space which is selected from among four kinds of color space including a 16 bit color space, two kinds of 8 bit color space and an 8 bit gray scale.

In the case of two kinds of 8 bit color space, a conversion (look-up) table (LUT) is recorded in a ROM 108 beforehand. The conversion table is held within the control program 114 on the PC 102 for a reverse pallet conversion process by which the R, G and B colors of an arbitrary number of bits are converted into pallet codes of an arbitrary number of bits. In converting the pallet codes into the R, G and B colors, the conversion is performed reversely to the reference conversion table.

The ROM 108 is of a capacity of 1 M bits and is arranged to have an input of 17 bits and an output of 8 bits. In the input, one bit of 17 bits is used for selection of one of two kinds of color space and the reverse pallet conversion is performed with the remaining 16 bits.

In the case of conversion into the 8 bit gray scale, the input signal is first added up in a ratio of "R:G:B=1:2:1" to obtain a spurious luminance signal of 10 bits. Of the 10 bits, the upper 8 bits are used as an output signal and expression is made by 256 steps of gradation.

In converting into a 16 bit color space or an 8 bit color space, the input signal of 0.24 bits is first converted into an RGB signal of 16 bits. The RGB signal is formed by dropping arbitrary bits from each of the 8 bit R, G and B signals to make them have five bits respectively (R:G:B=5:5:5). For this purpose, lower three bits of each of the R, G and B signals are dropped out. In a case where the set color space is a 16 bit color space, the color space conversion can be done solely by this process and a signal of 16 bits thus obtained becomes an output signal.

If the color space set is an 8 bit color space, a pallet code for the 8 bit color space corresponding to the converted 16 bit RGB signal is formed by making reference to the reverse pallet codes provided in the ROM 108 for an 8 bit color space. The pallet code which is to be used for the conversion is prepared in the following manner.

Figure 3:
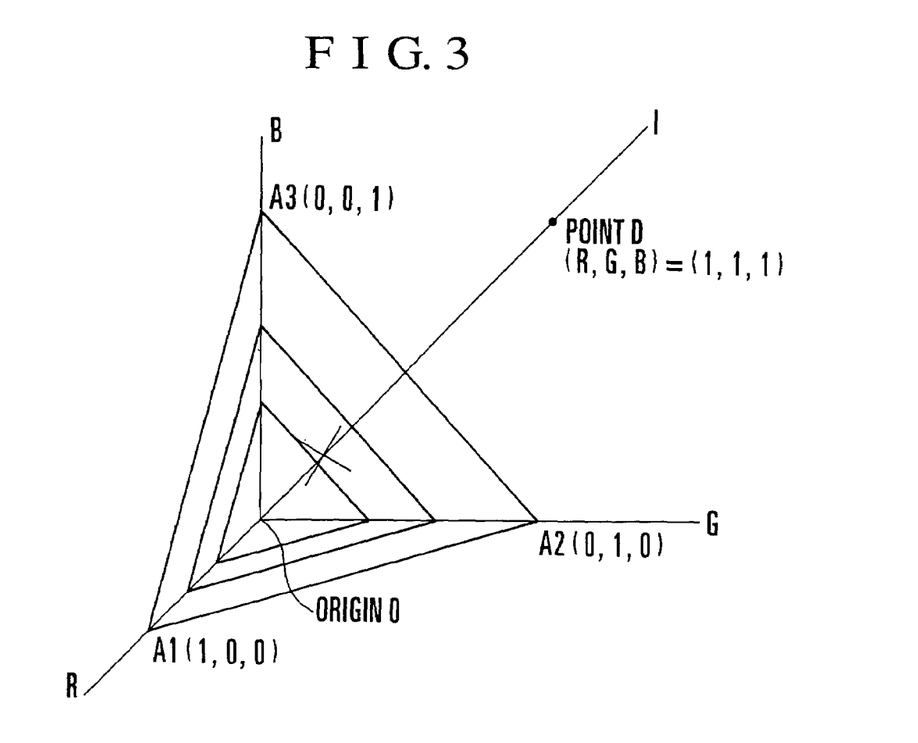
FIG. 3 shows a color space expressed in an RGB mode.

A color space expressed in the RGB mode can be depicted as shown in FIG. 3. In FIG. 3, the intensity of the R, G and B signals (0<R, G, B<1) is indicated by three axes R, G and B. An origin 0 represents black, while a point D of (R, G, B)=(1, 1, 1) represents white. Points on a straight line I connecting the origin 0 and the point D have no color and represent brightness only.

Figure 4:
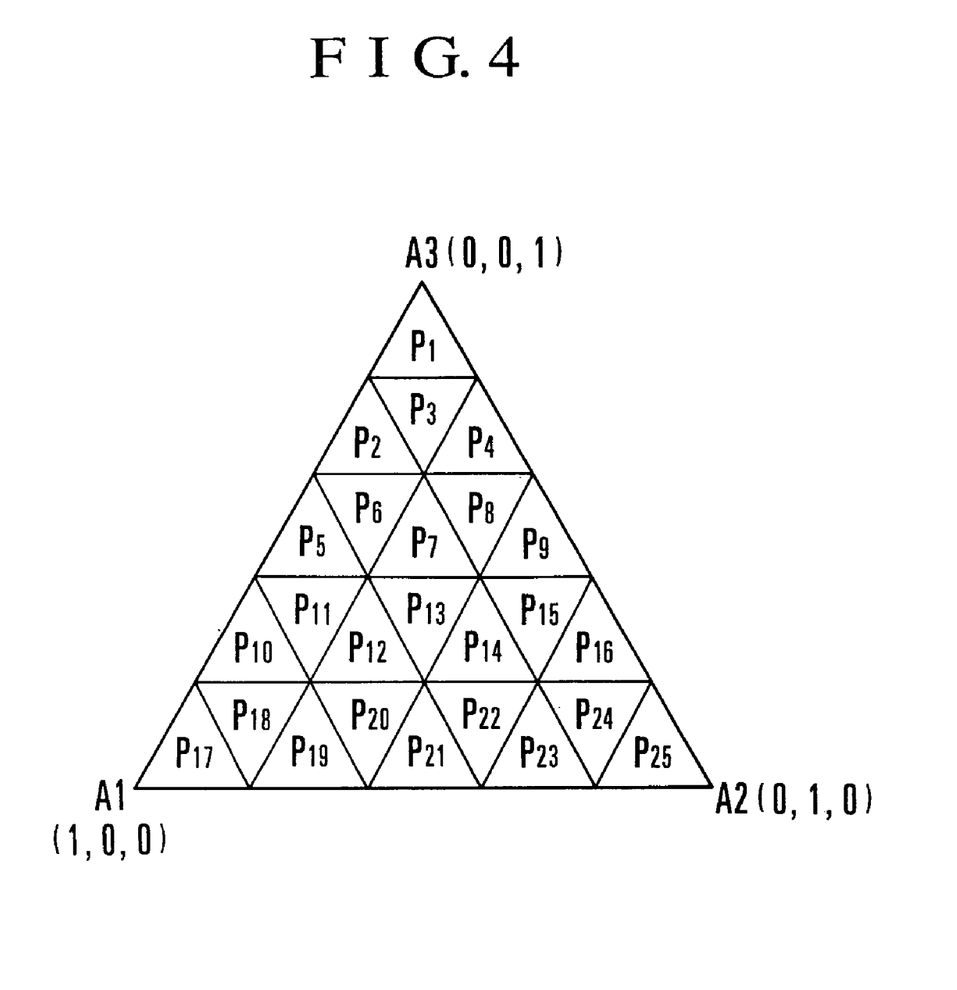
FIG. 4 shows, by way of example, how the color space in the RGB mode is converted into a pallet form.

FIG. 4 shows one plane which passes points A1, A2 and A3 on the axes indicating the pure R, G and B colors within the color space shown in FIG. 3. This space is divided into small areas. The color obtained within each of the small areas is expressed by one color to which a number is assigned. These color numbers are assumed to be pallet codes P1 to P25. By preparing an arbitrary number of such planes in the color space within the range of 0<1<1 as shown in FIG. 3, a pallet of 256 colors of 8 bits is prepared. In this case, the pallet codes of two kinds are used. These pallet codes differ in the number of planes within the color space of FIG. 3 and in the number of divisions made within one plane of FIG. 4.

A reverse conversion table of the pallet codes prepared in the above-stated manner is recorded in the ROM 108. To convert the 16 bit RGB data existing within the area indicated as P1 in FIG. 4 into data P1, the 16 bit RGB data within the area P1 is used as an address in the ROM 108 and the pallet code of the area P1 is included in a corresponding data area. Therefore, when a signal of 17 bits obtained by adding one pallet table selecting bit to the 16 bit RGB signal is inputted to the ROM 108, a pallet code of 8 bits is outputted.

While the input signal is described as a 16 bit RGB signal in this case, the arrangement may be changed to have the 24 bit RGB signal which is inputted to the color space converting part 107 used as the signal to be inputted to the ROM 108. In that case, although the capacity of the ROM 108 must be increased by as much as the increase of the number of bits, the color space to be used for the preparation of the pallet code can be more finely divided accordingly.

An output signal is thus formed by converting the color space according to a setting value. Further, in a case where the signal inputted to the color space converting part 107 is of the YUV type (mode) as mentioned in the foregoing, the input signal can be handled by first carrying out a process of converting the YUV mode into the RGB mode in addition to other processes. However, the processes can be simplified by setting reverse pallet codes to include the conversion from the YUV mode to the RGB mode beforehand at the time of reverse pallet conversion. It is also possible to handle the input signal by leaving it in the state of the YUV mode at the color space converting part 107 and to convert it into the RGB mode on the control program 114. Such arrangement has an advantage in that, in handling the same number of bits, a greater number of colors can be expressed than in the case of the RGB mode.

The video signal converted into an arbitrary color space in the above-stated manner is converted into an arbitrary image format. For high-speed processing, such as a moving image display process, the image format must be converted into a format that can be directly handled by a display part 115 disposed within the external PC 102. After completion of the image format conversion, the image data is serially supplied to an FIFO memory 109.

At the FIFO memory 109, the image data from the color space converting part 107 is stored on the basis of a signal coming from a control signal generating part 110. The control signal generating part 110 also forms a reading signal on the basis of a signal coming from the control program 114 of the PC 102 and supplies the reading signal to the FIFO memory 109 for reading image data. The image data read out is sent via the I/F part 112 to the external PC 102. As mentioned in the foregoing, the bus width of the I/F part 112 is 16 bits. In a case where the color space of the image data formed consists of 8 bits, the data transfer speed is increased by putting data of two picture elements together to temporarily convert the 8 bit image data into 16 bit image data which is equal to the bus width of the I/F part 112. The image data is thus sent to the I/F part 112 in an apparent state of having its data amount reduced to one half. The data length is converted in this manner by the control signal generating part 110 which handles the signals for writing and reading into and out of the FIFO memory 109.

At the external PC 102, the control program 114 reads out the data from within the image pickup apparatus 101. The data is sent to the display part 115 through an operating system 113. The display part 115 then displays the video image picked up by the image pickup apparatus 101. For the display, a pallet conversion table which is the same as a table held in the ROM 108 of the image pickup apparatus 101 is sent beforehand to the display part 115 which is disposed within the PC 102 to make the color space of the display part 115 coincide with that of the image pickup apparatus 101.

In a case where the color space set is a 16 bit color space, information on a 24 bit color space without the pallet is sent to the display part 115 within the PC 102. After that, the PC 102 reads out the picture element data from the FIFO memory 109 through the I/F part 112. The data thus obtained is temporarily stored in a memory (not shown) which is disposed within the PC 102.

In reading the data from the FIFO memory 109, a reading signal is shaped by the control signal generating part 110 on the basis of a reading signal formed by a CPU disposed within the PC 102. If the color space set is 8 bits, a process is performed on the control program 114 to form two 8-bit data from the 16-bit data.

Further, in a case where the color space set is a 16 bit color space, the data is converted into a 24-bit color format by putting 0 or 1 into the bit position dropped within the image pickup apparatus 101 in such a way as to make the color space coincide with the color space information sent to the display part 115 before. Since the image data consists of solely the data of picture elements under this condition, when the amount of data reaches an amount for one picture, the control program 114 adds a header and a footer of the image size or the like to the picture element data to shape it into an arbitrary image format. The image data thus shaped is sent to the display part 115.

Since the data sent to the display part 115 is thus processed into such a format that can be handled directly by the display part 115 as mentioned above, the display part 115 can show a video image to the operator by processing the data at a high speed as the data needs no converting action. These processes are allowed to continue until the operator gives an instruction for termination of the video image shooting through the software provided on the PC 102.

The processes described above enables the video image picked up by the image pickup apparatus 101 to be transferred at a high speed to the PC 102 for a display.

Second Embodiment

A second embodiment of the invention is arranged in the same manner as the first embodiment except in the following point. The second embodiment forms an output signal of 8 bits from an input signal of 16 RGB bits by carrying out, with a logic circuit and without the ROM 108, the reverse pallet conversion which is performed at the color space converting part 107 in the case of the first embodiment. The second embodiment thus can be more simply arranged as it dispenses with the ROM 108.

Third Embodiment

A third embodiment of the invention is arranged in the same manner as the first embodiment except in the following point. In this case, the ROM 108 of the first embodiment is replaced with a RAM. The third embodiment is thus arranged to permit writing the reverse pallet conversion table from the control program 114. The arrangement of the third embodiment permits use of pallet conversion tables of varied kinds irrespective of the storage capacity of the memory, so that the color space conversion can be carried out most appositely to each of different video images.

Further, use of a flash memory or a nonvolatile memory such as an EEPROM or the like in place of the RAM also gives an advantageous effect similar to the use of the RAM. In such a modification, the power consumption on the side of the image pickup apparatus 101 becomes less than in the case of the RAM.

Fourth Embodiment

Figure 5:
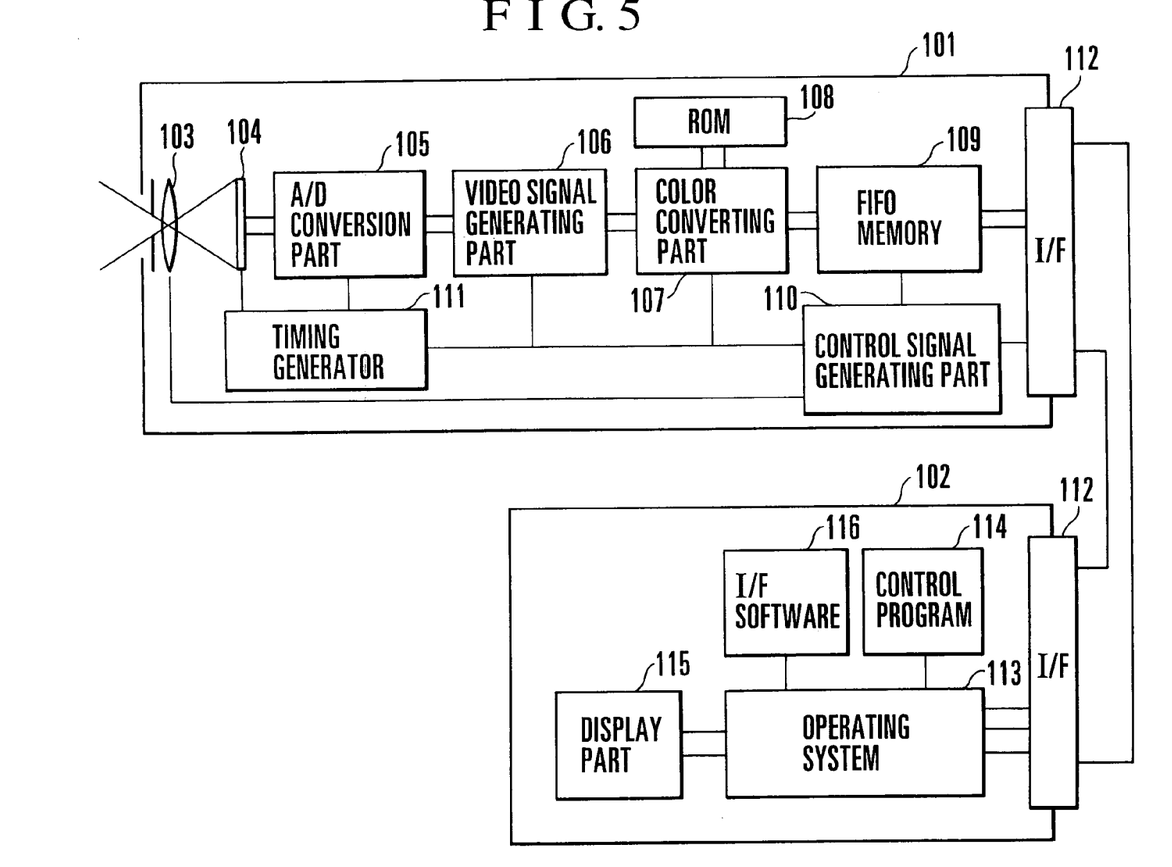
FIG. 5 is a block diagram showing the arrangement of a fourth embodiment of the invention.

A fourth embodiment of the invention applicable to a case where attribute information on an equipment to be used, such as the PCMCIA standards, etc., is required by the I/F part 112 included in the first embodiment. FIG. 5 shows the arrangement of an image pickup system which is the fourth embodiment of the invention.

Referring to FIG. 5, in a case where the image pickup apparatus 101 is in a card-like shape conforming to the PCMCIA standards, the attribute information must be transmitted to the external PC 102 for the recognition of the image pickup apparatus 101. In this case, a ROM 108 in which the attribute information on the image pickup apparatus 101 is recorded is used in common as a ROM in which a reverse conversion table is recorded.

The recognition of the image pickup apparatus 101 to be made on the side of the PC 102 is effected by means of an I/F software part 116 disposed within the PC 102. An attribute reading signal is sent to the image pickup apparatus 101 from the I/F software part 116. When the attribute reading signal is transmitted via the I/F part 112 to the control signal generating part 110 of the image pickup apparatus 101, an address at which the attribute information is recorded in the ROM 108 is sent from the control signal generating part 110 to the ROM 108 through the color space converting part 107 to enable the attribute information to be read out. The attribute information is sent via the FIFO memory 109 and the I/F part 112 to the I/F software part 116 disposed within the PC 102 to permit the recognition of the image pickup apparatus 101.

After the recognition of the image pickup apparatus 101, the control program 114 controls the image pickup apparatus 101 to cause a picked-up video image to be sent to the display part 115 disposed within the PC 102. The display part 115 shows the image to the operator. The flow of processes for shooting is the same as in the case of the first embodiment.

In a case where an I/F part which requires the attribute information or the like is used, the arrangement of this (fourth) embodiment permits simplification of the apparatus, because the attribute information and the reverse pallet conversion table are recorded in a common ROM 108.

The disclosed arrangement of each embodiment of the invention described enables the image pickup system and the image pickup apparatus to transfer a large amount of a video signal in a digital form at a high speed even in a case where the data processing capability on the part of display is low by compressing the video signal according to the look-up table (LUT) held within the color space converting part 107.

The use of a common LUT by the color space converting part 107 disposed within the image pickup apparatus 101 and the external PC 102 permits high speed data processing with simple arrangement. Further, the arrangement of having a plurality of LUTs on the side of the image pickup apparatus 101 permits selective use of a table suited for the video image. In a case where the I/F part 112 of the system requires attribute information, the arrangement of having both the LUT and the attribute information in a common ROM simplifies the arrangement.

The arrangement of having the LUT held within a reloadable memory permits the external PC 102 to selectively record an LUT suited for the video image into the reloadable memory. The arrangement makes LUTs of varied kinds usable without recourse to a memory of a large capacity. Further, with the LUT arranged in the form of a logic circuit, the system can be simply arranged.

The embodiments of the invention described in the foregoing have the following advantages. The function of processing the picked-up image signal formed by the image pickup unit and the image pickup control function are disposed in part within the external picked-up image signal processing apparatus, so that the image pickup unit can be arranged to have a smaller size. The image pickup unit, therefore, can be arranged in the shape of a card conforming to the PCMCIA standards or the like. In a case where a picked-up image signal is to be processed by a computer or the like, the conventional arrangement has necessitated the picked-up signal to be converted into a television format of the NTSC system or the like before converting the signal into a digital signal for the computer. The conventional arrangement, therefore, has involved some duplicating part in processing the signal. In accordance with the invention, on the other hand, such a wasteful process can be eliminated. Further, according to the arrangement of each embodiment of the invention described, an image pickup function can be simply added to a signal processing apparatus such as a computer. Besides, control over the operation of the computer and the image pickup unit can be accomplished in a manner most apposite to their characteristics. Further, the arrangement of changing the color space converting characteristic according to the display capability of the external signal processing apparatus also contributes to the elimination of a wasteful signal processing action, so that the efficiency of the data communication can be optimized. Therefore, the whole system can be arranged to be efficient in data processing speed without wasting electric energy.

What is claimed is:

1. An image pickup apparatus comprising:
   an image pickup device for forming a digital image signal;
   a color space information memory that stores color space information;
   a color bit number converting part arranged to convert color bit number of said digital image signal in response to an external signal from an external apparatus;
   a device recognition attribute information memory for storing device recognition attribute information; and
   an interface part arranged to communicate with the external apparatus,
   wherein said interface part sends said device recognition attribute information to said external apparatus,
   then said interface part receives said external signal with which the color bit number of said digital image signal is controlled using said color space information according to a result of recognition by said external apparatus.

2. An image pickup apparatus according to claim 1, wherein said color bit number converting part converts color space according to the external signal.

3. An image pickup apparatus according to claim 1, wherein said external apparatus comprises a PC.

4. An image pickup apparatus according to claim 2, wherein said image pickup apparatus is directly connectable with said PC.

5. An image pickup method, comprising:
   picking up of an image to form a digital image signal;
   converting color bit number of said digital image signal in response to an external signal from an external apparatus;
   storing device recognition attribute information in a device recognition attribute information memory;
   storing a color space information in a color space information memory;
   sending said device recognition attribute information to said external apparatus through an interface part; and
   receiving said external signal with which the color bit number of said digital image signal is controlled using said color space information according to a result of recognition by said external apparatus.

6. An image pickup method according to claim 5, wherein said converting includes converting color space according to the external signal.

7. An image signal processing apparatus electrically connectable to an image pickup device that forms a digital image signal,
   wherein said image pickup apparatus comprises a color bit number converting part arranged to convert color bit number of said digital image signal in response to an external signal,
   a device recognition attribute information memory for storing device recognition attribute information,
   a color space information memory that stores color space information, and
   an interface part arranged to send said device recognition attribute information to said image signal processing apparatus and receive said external signal with which the color bit number of said digital image signal is controlled using said color space information according to a result of recognition by said external apparatus,
   comprising:
   a communication part arranged to receive said device recognition attribute information from said image pickup apparatus to recognize said image pickup apparatus;
   a recognizing part arranged to recognize the image pickup apparatus in response to said device recognition attribute information; and
   a control part arranged to send the external signal to said image pickup apparatus through said communication part to control the color bit number of said digital image signal according to a result of recognition by said recognizing part.

8. An image signal processing apparatus according to claim 7, wherein said color bit number converting part converts color space according to the external signal.

9. An image signal processing method for processing a digital image signal received from an image pickup device that forms a digital image signal, wherein said image pickup apparatus comprises:
   a color bit number converting part arranged to convert color bit number of said digital image signal in response to an external signal,
   a device recognition attribute information memory for storing device recognition attribute information,
   a color space information memory that stores color space information, and
   an interface part arranged to send said device recognition attribute information to said image signal processing apparatus and receive said external signal with which the color bit number of said digital image signal is controlled using said color space information according to a result of recognition by said external apparatus, comprising:

receiving said device recognition attribute information from said image pickup apparatus;

recognizing the image pickup apparatus in response to said device recognition attribute information; and sending the external signal to said image pickup apparatus to control the color bit number of said digital image signal according to a result of the recognizing.

10. An image signal processing method according to claim 9, wherein external signal controls the color space of said digital image signal according to the result of the recognizing.

11. An image pickup apparatus according to claim 1, further comprising:

said color space information memory stores a plurality of kinds of color space information, and said color bit number converting part converts the color bit number of said digital image signal using a selected color space information, and further comprising:

a selecting part that selects color space information among the plurality of kinds of color space information in response to an external signal from an external apparatus.

12. An image pickup method according to claim 5, further comprising:

storing a plurality of kinds of color space information in said stores color space information memory;

selecting color space information among the plurality of color space information in response to an external signal from an external apparatus; and converting color bit number of said digital image signal using the selected color space information.

13. An image signal processing apparatus according to claim 7, wherein said color space information memory stores a plurality of kinds of color space information, and an interface part arranged to send said device recognition attribute information to said image signal processing apparatus and receive said external signal with which the color bit number of said digital image signal is controlled using a selected color space information according to a result of recognition by said external apparatus, and further comprising a selecting part that selects color space information among the plurality of color space information in response to said device recognition attribute information.

14. An image signal processing method according to claim 9, wherein said interface part arranged to send said device recognition attribute information to said image signal processing apparatus and receive said external signal with which the color bit number of said digital image signal is controlled using a selected color space information according to a result of recognition by said external apparatus, said image pickup apparatus further comprising:

a color space information memory that stores a plurality of kinds of color space information, and a selecting part that selects color space information among the plurality of color space information in response to said device recognition attribute information.

15. An image pickup apparatus comprising:

an image sensor that converts an optical image into an image signal;

a color bit number converting circuit that converts color bit number according to a conversion memory; and an interface that receives an external instruction to change the color bit number.

16. An image pickup apparatus according to claim 15, wherein said memory includes a lookup table.

17. An image pickup method comprising:

image sensing by converting an optical image into an image signal;

color bit number converting for converting color bit number according to an output of a conversion memory; and interfacing for receiving an external instruction to change the color bit number.

18. An image pickup method according to claim 17, wherein the memory includes a lookup table.

* * * * *